United States Patent
Kawai et al.

(10) Patent No.: US 9,030,165 B2
(45) Date of Patent: May 12, 2015

(54) OPERATING MACHINE

(75) Inventors: Hiroaki Kawai, Akashi (JP); Koichi Shimomura, Akashi (JP); Hideaki Ishihara, Akashi (JP); Shintaro Sasai, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 464 days.

(21) Appl. No.: 13/614,058

(22) Filed: Sep. 13, 2012

(65) Prior Publication Data

US 2013/0082517 A1 Apr. 4, 2013

(30) Foreign Application Priority Data

Sep. 29, 2011 (JP) .................................. 2011-213917

(51) Int. Cl.
*H02J 7/00* (2006.01)
*H02J 7/14* (2006.01)
*H02J 7/04* (2006.01)
*B60L 11/18* (2006.01)
*B60R 16/033* (2006.01)

(52) U.S. Cl.
CPC .............. *H02J 7/041* (2013.01); *B60L 11/1818* (2013.01); *B60R 16/033* (2013.01); *H02J 7/044* (2013.01); *H02J 7/045* (2013.01); *H02J 7/1446* (2013.01); *Y02T 10/92* (2013.01)

(58) Field of Classification Search
USPC ........... 320/108, 109, 115, 134, 137, 155, 128
See application file for complete search history.

(56) References Cited

U.S. PATENT DOCUMENTS

| | | | | |
|---|---|---|---|---|
| 5,701,068 A * | 12/1997 | Baer et al. | ...................... | 320/119 |
| 5,742,229 A * | 4/1998 | Smith | ........................... | 340/438 |
| 6,357,011 B2 * | 3/2002 | Gilbert | .......................... | 713/300 |
| 7,332,881 B2 * | 2/2008 | Clark et al. | ................... | 318/139 |
| 7,782,021 B2 * | 8/2010 | Kelty et al. | ................... | 320/155 |
| 7,949,435 B2 * | 5/2011 | Pollack et al. | ................ | 700/291 |
| 2003/0007369 A1 * | 1/2003 | Gilbreth et al. | ................ | 363/35 |
| 2008/0067974 A1 * | 3/2008 | Zhang et al. | .................. | 320/104 |

FOREIGN PATENT DOCUMENTS

JP 2006-62782 3/2006

\* cited by examiner

*Primary Examiner* — Edward Tso
*Assistant Examiner* — Alexis A Boateng
(74) *Attorney, Agent, or Firm* — Oblon, McClelland, Maier & Neustadt, L.L.P.

(57) ABSTRACT

An operating machine includes: a charging time estimation unit that estimates a first estimated charging time required to restore a capacity of a first battery from a first estimated residual capacity to a target capacity value of the first battery and a second estimated charging time required to restore a capacity of a second battery from a second estimated residual capacity to a target capacity value of the second battery; a capacity management implementation unit that implements capacity management on the first battery and the second battery such that the first battery is charged for the first estimated charging time and the second battery is charged for the second estimated charging time; and a discharge amount limitation unit for limiting a discharge amount of the second battery during an idling stop so that a residual capacity of the second battery after discharge is maintained at or above a set value.

5 Claims, 13 Drawing Sheets

RESTARTING OF ENGINE AND IMPLEMENTATION OF CHARGING

OPERATING MACHINE

BACKGROUND OF THE INVENTION

1. Field of the Invention

The present invention relates to an operating machine such as a mobile crane or a shovel, and more particularly to an operating machine equipped with two batteries for performing idling stop control.

2. Background Art

Various proposals have been made recently for improving fuel efficiency, reducing exhaust gas and noise, and so on in an operating machine such as a mobile crane or a shovel by equipping the operating machine with an engine control device that performs idling stop control, in which an engine is stopped automatically during an idling operation, when a predetermined condition is established. Japanese Patent Application Publication No. 2006-62782, for example, describes an engine control device which, during a load lifting operation by a mobile crane, automatically stops an engine when a condition in which a crane operation is not underway and a condition in which a suspended load does not exist remain established simultaneously and continuously for a predetermined time, taking into consideration a situation in which an operator waits inside a cab between operations and so on.

Incidentally, a compressor of an air-conditioning device provided to condition air in the cab of the operating machine is typically driven by power from the engine either directly or via oil pressure, and cannot therefore be used when the engine is stopped. However, it is desirable for the operator to be able to use the air-conditioning device while waiting in the cab even during an idling stop in the engine. To realize this, structural improvements such as modifications must be implemented on the operating machine so that the compressor of the air-conditioning device can be driven by an electric motor, and the operating machine must be equipped with a second battery used to drive a load of an electric component such as the electric motor for driving the compressor during an idling stop in addition to a first battery provided normally to start the engine. As shown in FIG. 18, a circuit configuration in which an electric component load b, a first battery c, and a second battery d provided in the operating machine are connected in parallel to a power generation device a such as an alternator that is driven by the engine and a switch (not shown) or the like is used to enable discharging (energization) from the first battery c or the second battery d to the electric component load b side and charging from the power generation device a to the first battery c and the second battery d may be employed as a circuit configuration in this case.

With this circuit configuration, however, even when the first battery c and the second battery d are identical in type and capacity, if an engine rotation speed is low during charging from the power generation device a to the first battery c and the second battery d such that a sufficient power generation current cannot be secured in the power generation device a, charging/discharging occurs between the two batteries c, d in accordance with a capacity difference (more specifically, a residual capacity difference) between the two batteries c, d. In particular, the second battery d used to drive the electric component load b during an idling stop performs deeper discharging than the first battery c, and therefore discharging occurs from the first battery c to the second battery d. Here, when a degree of discharge of the second battery d is excessive, a discharge amount from the first battery c increases during charging. If, in this case, a sufficient charging time cannot be secured due to interruption of an operation by the operating machine or the like, the residual capacity of the first battery c does not satisfy a capacity required to start the engine, and as a result, an engine startup fault occurs during a subsequent engine startup operation.

SUMMARY OF THE INVENTION

An object of the present invention is to ensure, in a circuit configuration of an operating machine in which two batteries are connected in parallel to a power generation device via respective switches, that capacity management of the two batteries is performed using a method that can be implemented easily in terms of cost and so on, and that a capacity required to start an engine can be secured in a first battery at all times, even when a sufficient charging time cannot be secured due to interruption of an operation by the operating machine or the like, thereby preventing an engine startup fault.

An operating machine according to an aspect of the present invention includes: an engine serving as a power source; an engine control unit that performs idling stop control, in which said engine is stopped automatically during an idling operation, when a predetermined condition is established; an electric component; a power generation device that is driven by said engine to supply electricity; a first battery that is connected to said power generation device via a first switch, switched by said first switch between a condition of being charged by said power generation device and a condition of not being charged, and used to start said engine; a second battery that is connected to said power generation device in parallel with said first battery via a second switch, switched by said second switch between a condition of being charged by said power generation device and a condition of not being charged, and used to operate said electric component during an idling stop in said engine; a residual capacity estimation unit that estimates a first estimated residual capacity which is a residual capacity of said first battery and a second estimated residual capacity which is a residual capacity of said second battery; a charging time estimation unit that estimates a first estimated charging time which is a charging time required to restore a capacity of said first battery from said first estimated residual capacity to a target capacity value of said first battery and a second estimated charging time which is a charging time required to restore a capacity of said second battery from said second estimated residual capacity to a target capacity value of said second battery; a capacity management implementation unit that implements capacity management on said first battery by controlling said first switch such that said first battery is charged for said first estimated charging time and implements capacity management on said second battery by controlling said second switch such that said second battery is charged for said second estimated charging time; and a discharge amount limitation unit for limiting a discharge amount of said second battery during said idling stop in said engine so that a residual capacity of said second battery after discharge is maintained at or above a set value.

DETAILED DESCRIPTION OF THE EMBODIMENTS OF THE INVENTION

Embodiments of the present invention will be described below on the basis of the drawings.

First Embodiment

Figure 1:
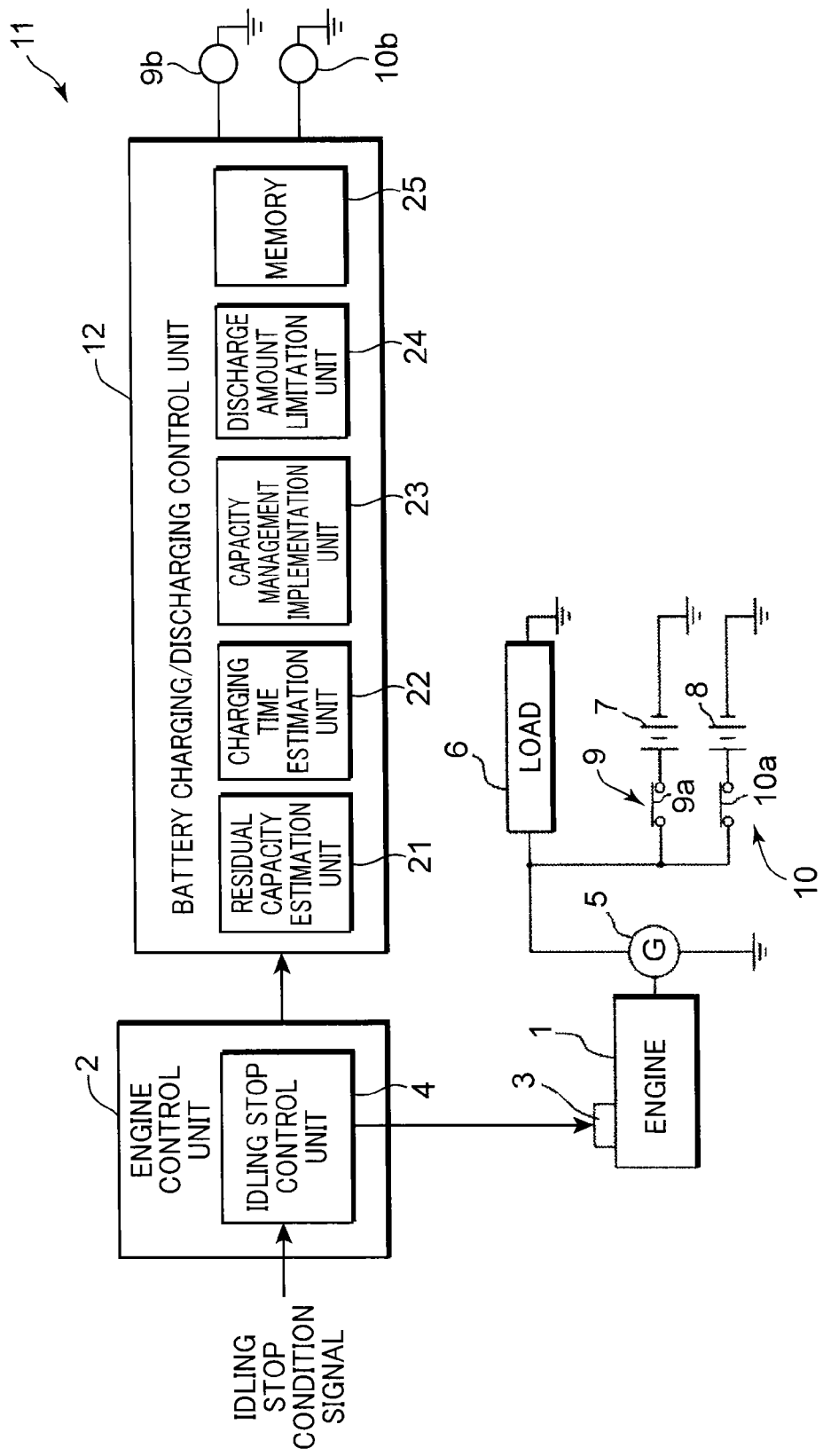
FIG. 1 is a block diagram showing an operating machine according to a first embodiment of the present invention.

FIG. 1 is a block diagram showing an operating machine equipped with a battery charging/discharging control device according to a first embodiment of the present invention. In FIG. 1, a reference numeral 1 denotes an engine serving as a power source, and a reference numeral 2 denotes an engine control unit that controls operations of the engine 1 via a governor 3. The engine control unit 2 includes an idling stop control unit 4 that performs idling stop control, in which the engine 1 is stopped automatically during an idling operation when a predetermined idling stop condition signal is input and a predetermined idling stop condition is established, separately from normal control for controlling an operation of the engine 1 in response to accelerator and brake pedal operations and so on by an operator. The idling stop control unit 4 performs the idling stop control when, for example, operating members provided in a cab for the operator to perform operations are not being operated and no part of a body of the operator is in contact with or close to the operating members, or when, in a particular case where the operating machine is a mobile crane, a condition in which a crane operation is not underway and a condition in which a suspended load does not exist remain established simultaneously and continuously for a predetermined time.

Further, a reference numeral 5 in FIG. 1 denotes an alternator serving as a power generation device that is driven by the engine 1. The alternator 5 is connected to various electric components 6 serving as electric loads provided in the operating machine in order to supply electricity to the electric components 6. Examples of the various electric components 6 include an engine starting starter, an electric motor for driving a compressor of an air-conditioning device, an illuminating lamp, and so on. In FIG. 1, a reference numeral 7 denotes a main battery serving as a first battery used to start the engine 1. The main battery 7 supplies stored power to the engine starting starter in particular, from among the electric components 6, in order to start the engine 1. Further, a reference numeral 8 denotes a sub-battery serving as a second battery used to operate the electric components 6 serving as the electric loads during an idling stop in the engine 1. The main battery 7 and the sub-battery 8 are connected to the alternator 5 in parallel. Furthermore, the main battery 7 is connected to the alternator 5 via a first switch 9, and the first switch 9 enables selection of (switching between) a condition in which charging from the alternator 5 to the main battery 7 is possible and a condition in which charging is impossible. The sub-battery 8, meanwhile, is connected to the alternator 5 via a second switch 10, and the second switch 10 enables selection of (switching between) a condition in which charging from the alternator 5 to the sub-battery 8 is possible and a condition in which charging is impossible. The main battery 7 and the sub-battery 8 are identical in type and capacity.

The first switch 9 and the second switch 10 are both constituted by relay switches. A relay contact 9a of the first switch 9 is connected in series to the main battery 7, and a relay contact 10a of the second switch 10 is connected in series to the sub-battery 8. Opening and closing of the relay contacts 9a, 10a of the two switches 9, 10 are controlled by a battery charging/discharging control device 11. The battery charging/discharging control device 11 includes a relay coil 9b of the first switch 9, a relay coil 10b of the second switch 10, and a battery charging/discharging control unit 12 that controls energization of the two relay coils 9b, 10b. Information indicating an operating condition of the engine 1 and so on is input into the battery charging/discharging control unit 12 from the engine control unit 2 in the form of signals.

The battery charging/discharging control unit 12 includes a residual capacity estimation unit 21, a charging time estimation unit 22, a capacity management implementation unit 23 and a discharge amount limitation unit 24, serving as functional blocks. Further, the battery charging/discharging control unit 12 includes a memory 25 that stores various values.

The residual capacity estimation unit 21 estimates an estimated residual capacity value $C_{main}$ which is a residual capacity of the main battery 7 and an estimated residual capacity value $C_{sub}$ which is a residual capacity of the sub-battery 8. Specifically, the residual capacity estimation unit 21 estimates a new estimated residual capacity value $C_{main}$ of the main battery 7 by determining a discharge amount of the main battery 7 during every discharge operation of the main battery 7 and subtracting the determined discharge amount of the main battery 7 from the estimated residual capacity value $C_{main}$ of the main battery 7 stored in the memory 25 at that time, and updates the estimated residual capacity value $C_{main}$ of the main battery 7 stored in the memory 25 to the new estimated residual capacity value $C_{main}$. The residual capacity estimation unit 21 estimates a new estimated residual capacity value $C_{sub}$ of the sub-battery 8 by determining a discharge amount of the sub-battery 8 during every discharge operation of the sub-battery 8 and subtracting the determined discharge amount of the sub-battery 8 from the estimated residual capacity value $C_{sub}$ of the sub-battery 8 stored in the memory 25 at that time, and updates the estimated residual capacity value $C_{sub}$ of the sub-battery 8 stored in the memory 25 to the new estimated residual capacity value $C_{sub}$. The estimated residual capacity value $C_{main}$ of the main battery 7 is included in the concept of the first estimated residual capacity of the present invention. The estimated residual capacity value $C_{sub}$ of the sub-battery 8 is included in the concept of the second estimated residual capacity of the present invention.

The charging time estimation unit 22 estimates charging times $T_{m1}$, $T_{m2}$ required to restore a capacity of the main battery 7 from the estimated residual capacity value $C_{main}$ of the main battery 7 to the target capacity value of the main battery 7 and charging times $T_{s1}$, $T_{s2}$ required to restore a capacity of the sub-battery 8 from the estimated residual capacity value $C_{sub}$ of the sub-battery 8 to the target capacity value of the sub-battery 8. The charging times $T_{m1}$, $T_{m2}$ relating to the main battery 7 are included in the concept of the first estimated charging time of the present invention. The charging times $T_{s1}$, $T_{s2}$ relating to the sub-battery 8 are included in the concept of the second estimated charging time of the present invention. When the charging time estimation unit 22 estimates the charging times $T_{m1}$, $T_{m2}$ relating to the main battery 7, the charging time estimation unit 22 uses the estimated residual capacity value $C_{main}$ of the main battery 7 stored in the memory 25 at that time. When the charging time estimation unit 22 estimates the charging times $T_{s1}$, $T_{s2}$ relating to the sub-battery 8, the charging time estimation unit 22 uses the estimated residual capacity value $C_{sub}$ of the sub-battery 8 stored in the memory 25 at that time.

The capacity management implementation unit 23 implements capacity management on the main battery 7 by controlling opening and closing of the first switch 9 such that the main battery 7 is charged during the charging times $T_{m1}$, $T_{m2}$ relating to the main battery 7, and implements capacity management on the sub-battery 8 by controlling opening and closing of the second switch 10 such that the sub-battery 8 is charged during the charging times $T_{s1}$, $T_{s2}$ relating to the sub-battery 8.

The discharge amount limitation unit 24 limits an amount of discharge from the sub-battery 8 during the idling stop in the engine 1 so that a residual capacity of the sub-battery 8 after discharge is maintained at or above a set value (a discharge limit capacity value $C_{lim}$). Here, the discharge limit capacity value $C_{lim}$ is set in order to secure a capacity of the main battery 7 required to start the engine 1 during a subsequent operation of the operating machine. Specifically, the discharge limit capacity value $C_{lim}$ is set at a value that satisfies a condition whereby, when discharge from the main battery 7 having a larger capacity than the discharge limit capacity value $C_{lim}$ to the sub-battery 8 having a capacity equal to the discharge limit capacity value $C_{lim}$ is performed due to a capacity difference between the main battery 7 and the sub-battery 8, the residual capacity of the main battery 7 is maintained at or above a minimum capacity required to start the engine 1. More specifically, the discharge limit capacity value $C_{lim}$ is set at a value that satisfies a condition whereby the minimum capacity required to start the engine 1 is smaller than a value of half a sum of the discharge limit capacity value $C_{lim}$ and a capacity of the main battery 7 before discharge. The discharge amount limitation unit 24 limits the amount of discharge from the sub-battery 8 by opening the second switch 10 so as to halt discharging from the sub-battery 8, when the residual capacity of the sub-battery 8 lowers and reaches the discharge limit capacity value $C_{lim}$ during the idling stop in the engine 1.

Next, the content of control executed by the battery charging/discharging control unit 12 will be described using flowcharts shown in FIGS. 2 to 5 and with reference to FIGS. 6 to 9.

Figure 2:
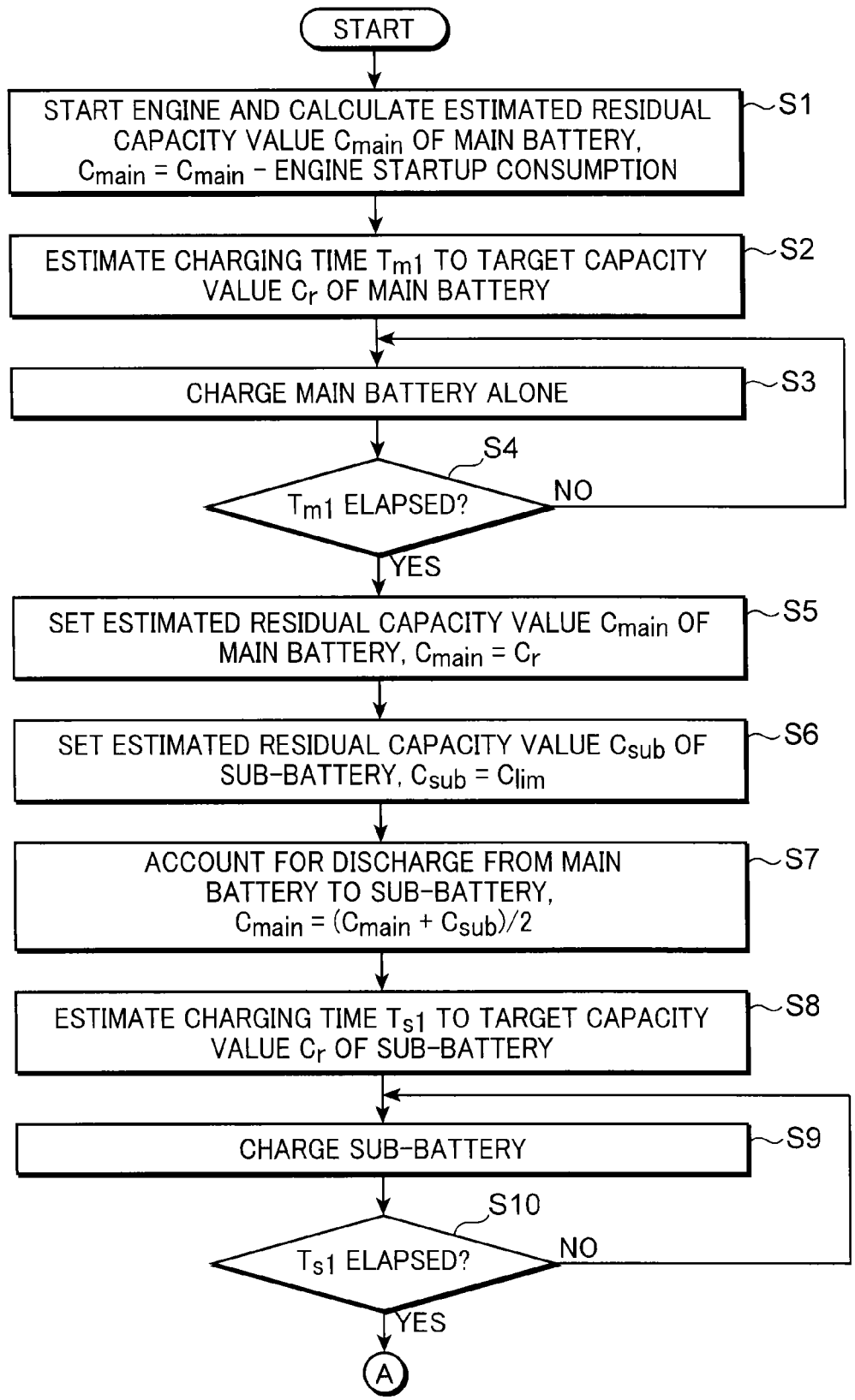
FIG. 2 shows a first half part of a flowchart illustrating the content of control executed by a battery charging/discharging control unit according to the first embodiment.
Figure 6:
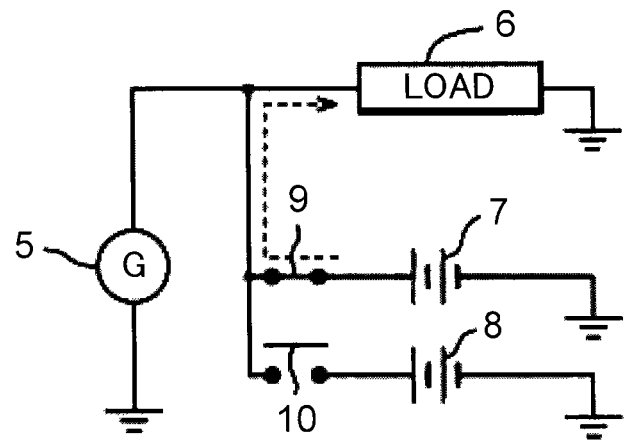
FIGS. 6 to 9 are illustrative views illustrating the content of the aforesaid control.

In FIG. 2, first, in Step S1, the engine 1 is started in response to an engine starting operation performed by the operator. At this time, as shown in FIG. 6, the battery charging/discharging control unit 12 closes the first switch 9, or more specifically the relay contact 9a, and opens the second switch 10, or more specifically the relay contact 10a. Thus, power is supplied to the engine starting starter of the electric component loads 6 from the main battery 7, or in other words discharging is performed, and as a result, the engine 1 is started. Further, in Step S1, the residual capacity estimation unit 21 of the battery charging/discharging control unit 12 calculates an estimated residual capacity value $C_{main}$ of the main battery 7 following startup of the engine 1 by determining a capacity of the main battery 7 consumed during startup of the engine 1, or in other words a discharge amount of the main battery 7, and subtracting the determined discharge amount from the estimated residual capacity value $C_{main}$ of the main battery 7 stored in the memory 25, and updates the estimated residual capacity value of the main battery 7 stored in the memory 25 to the calculated estimated residual capacity value $C_{main}$. Note that the capacity of the main battery 7 consumed during startup of the engine 1 is an experiential value or an actually measured value that is set in advance for use.

Figure 7:
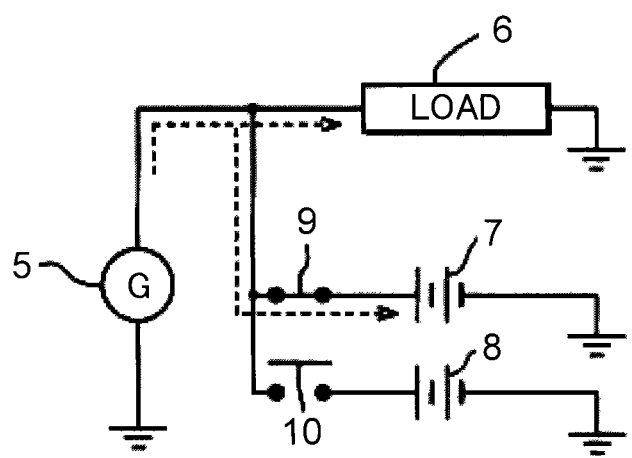

Next, in Step S2, the charging time estimation unit 22 of the battery charging/discharging control unit 12 estimates a charging time $T_{m1}$ required to charge the main battery 7 from the current estimated residual capacity value $C_{main}$ of the main battery 7 currently stored in the memory 25 to a charging target capacity value $C_r$ of the main battery 7. Next, in Step S3, charging is performed on the main battery 7 alone. As shown in FIG. 7, the capacity management implementation unit 23 performs charging on the main battery 7 alone by keeping the first switch 9 closed and the second switch 10 open, as in the operation to start the engine 1. In Step S4, the capacity management implementation unit 23 of the battery charging/discharging control unit 12 determines whether or not the charging time $T_{m1}$ has elapsed, and when the charging time $T_{m1}$ is determined to have elapsed, the residual capacity estimation unit 21 sets the estimated residual capacity value $C_{main}$ of the main battery 7 in Step S5 by replacing the estimated residual capacity value $C_{main}$ of the main battery 7 stored in the memory 25 with the charging target capacity value $C_r$. Here, the charging target capacity value $C_r$ is a capacity value set by a user. When the charging target capacity value $C_r$ takes a value corresponding to 100% of a maximum charging capacity of the main battery 7, the time required to charge the main battery 7 becomes excessive, and therefore this value is unrealistic. Hence, in actuality, the charging target capacity value $C_r$ is set at a value between 80% and 90% of the maximum charging capacity of the main battery 7. Note that when the capacity management implementation unit 23 determines that the charging time $T_{m1}$ has not yet elapsed in Step S4, the processing of Step S3 onward is repeated.

Next, in Step S6, the residual capacity estimation unit 21 sets an estimated residual capacity value $C_{sub}$ of the sub-battery 8 at a value equal to the discharge limit capacity value $C_{lim}$. More specifically, the residual capacity estimation unit 21 stores a value equal to the discharge limit capacity value $C_{lim}$ in the memory 25 as the estimated residual capacity value $C_{sub}$ of the sub-battery 8. When setting the estimated residual capacity value $C_{sub}$ of the sub-battery 8, the estimated residual capacity value $C_{sub}$ of the sub-battery 8 is estimated purposely on the small side, taking into account the possibility that charging of the sub-battery 8 was interrupted during a previous operation of the operating machine.

Next, in Step S7, the residual capacity estimation unit 21 accounts for discharge from the main battery 7 to the sub-battery 8 occurring when the sub-battery 8 is charged together with the main battery 7, as will be described below. A discharge amount in this case takes a maximum value of half a difference between a pre-discharge capacity of the main battery 7 and the capacity of the sub-battery 8, and therefore a capacity of the main battery 7 immediately after the start of charging of the sub-battery 8 takes a value of half a sum of the pre-discharge capacity of the main battery 7 and the capacity of the sub-battery 8. Hence, to account for this discharge from the main battery 7 to the sub-battery 8 in Step S7, the residual capacity estimation unit 21 calculates the estimated residual capacity value $C_{main}$ of the main battery 7 using a following Equation (1), and replaces the estimated residual capacity value $C_{main}$ of the main battery 7 stored in the memory 25 with the calculated estimated residual capacity value $C_{main}$.

$$C_{main} = (C_{main} + C_{sub})/2 \quad (1)$$

Figure 8:
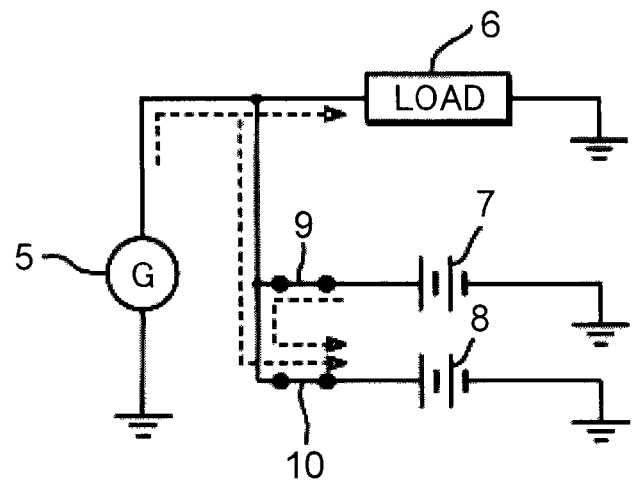

Next, in Step S8, the charging time estimation unit 22 estimates a charging time $T_{s1}$ required to charge the sub-battery 8 from the estimated residual capacity value $C_{sub}$ of the sub-battery 8 currently stored in the memory 25 to a charging target capacity value $C_r$ of the sub-battery 8. Next, in Step S9, the sub-battery 8 is charged together with the main battery 7. As shown in FIG. 8, the capacity management implementation unit 23 charges the sub-battery 8 by closing both the first switch 9 and the second switch 10. Here, in a case where the sub-battery 8 has consumed capacity during an idling stop performed in a previous operation of the operating machine and an engine rotation speed is low, a sum of a current consumed by the electric component load 6 and a charging current required by the sub-battery 8 may exceed a current generated by the alternator 5. When the first switch 9 and the second switch 10 are both closed in order to charge the sub-battery 8 in such a case, discharging occurs from the main battery 7, which has already completed charging in Steps S2 to S4, to the sub-battery 8. Therefore, discharge from the main battery 7 to the sub-battery 8 is accounted for in Step S7, as described above, before charging the sub-battery 8 in Step S9.

Figure 3:
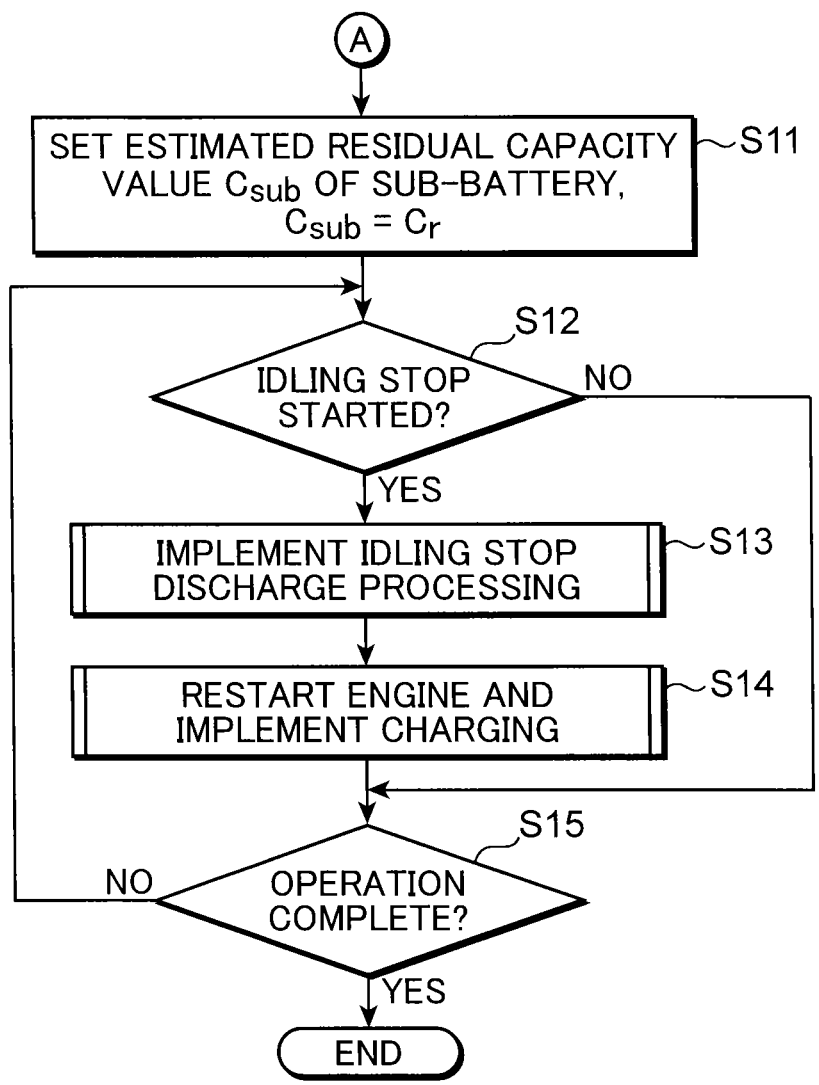
FIG. 3 shows a second half part of the flowchart illustrating the content of the control executed by the battery charging/discharging control unit according to the first embodiment.

Next, in Step S10, the capacity management implementation unit 23 determines whether or not the charging time $T_{s1}$ has elapsed, and when the charging time $T_o$ is determined to have elapsed, the residual capacity estimation unit 21 sets the estimated residual capacity value $C_{sub}$ of the sub-battery 8 in Step S11 of FIG. 3 by replacing the estimated residual capacity value $C_{sub}$ of the sub-battery 8 stored in the memory 25 with the charging target capacity value $C_r$ of the sub-battery 8. Here, the charging target capacity value $C_r$ of the sub-battery 8 is a capacity value set by the user, similarly to that of the main battery 7. When the charging target capacity value $C_r$ takes a value corresponding to 100% of a maximum charging capacity of the sub-battery 8, the time required to charge the sub-battery 8 becomes excessive, and therefore this value is unrealistic. Hence, in actuality, the charging target capacity value $C_r$ of the sub-battery 8 is set at a value between 80% and 90% of the maximum charging capacity of the sub-battery 8. Note that when the capacity management implementation unit 23 determines that the charging time $T_{s1}$ has not yet elapsed in Step S10, the processing of Step S9 onward is repeated.

Next, in Step S12, the battery charging/discharging control unit 12 determines, on the basis of a signal from the engine control unit 2, whether or not an idling stop has started in the engine 1. When the battery charging/discharging control unit 12 determines that an idling stop has started, idling stop discharge processing is implemented in Step S13, whereupon the engine 1 is restarted and the main battery 7 and sub-battery 8 are charged in Step S14. Processing of Step S15 is then performed. When, on the other hand, the battery charging/discharging control unit 12 determines that an idling stop has not started, the processing of Step S15 is performed immediately. In Step S15, the battery charging/discharging control unit 12 determines whether or not the operation of the operating machine is complete on the basis of whether or not an operation completion signal, for example a signal that is output from the engine control unit 2 when the operator performs an operation to stop the engine 1 using an engine key, has been output from the engine control unit 2. When the battery charging/discharging control unit 12 determines in this determination that the operation completion signal has not been output from the engine control unit 2 and therefore that the operation is not complete, the processing of Step S12 onward is repeated. When, on the other hand, the battery charging/discharging control unit 12 determines that the operation completion signal has been output from the engine control unit 2 and therefore that the operation is complete, the control is terminated.

Figure 4:
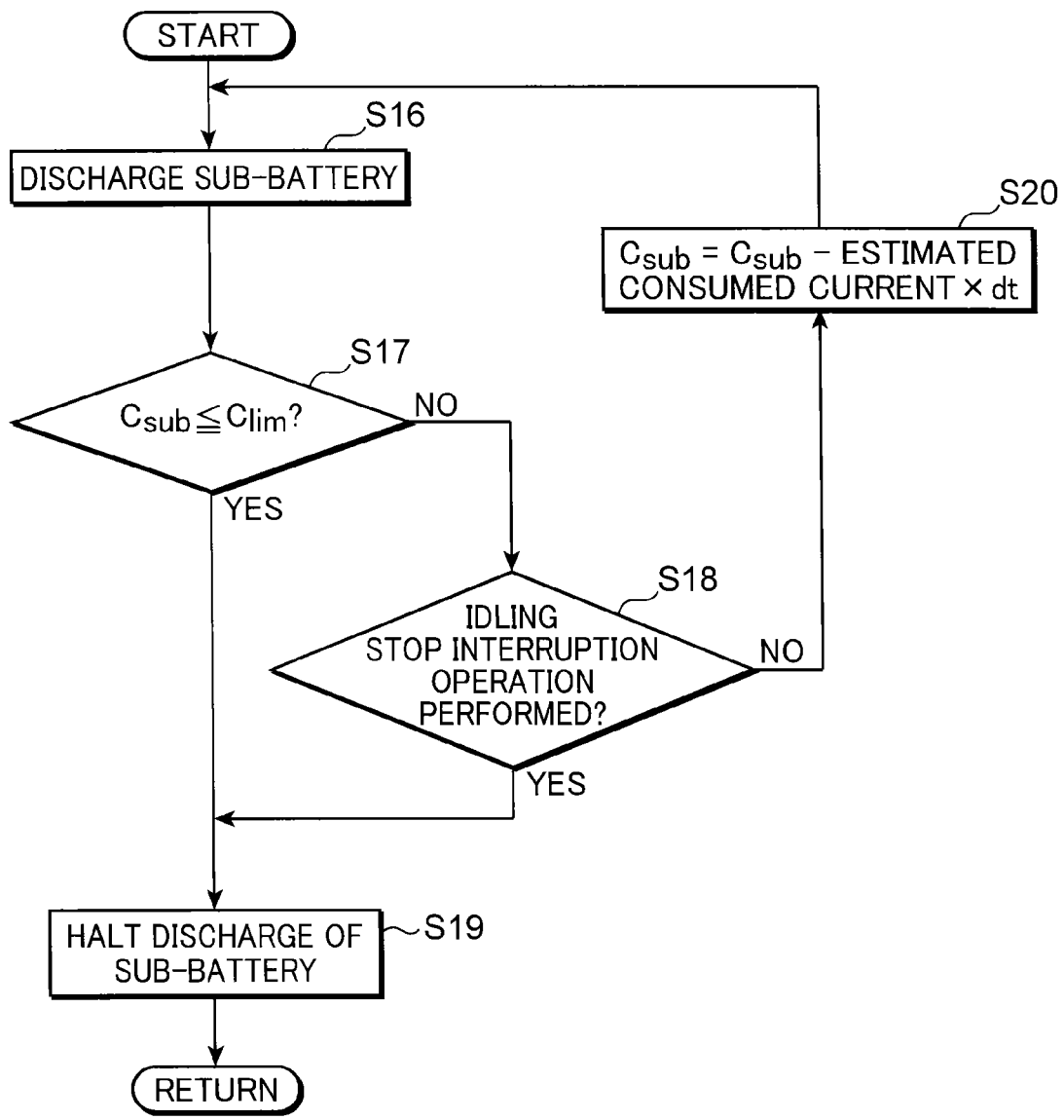
FIG. 4 is a flowchart showing a sub-routine of idling stop discharge processing.

The idling stop discharge processing of Step S13 is performed in accordance with a flowchart of a sub-routine shown in FIG. 4.

Figure 9:
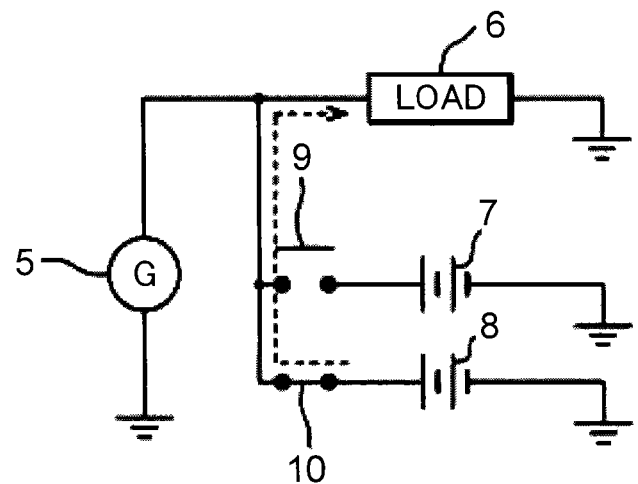

More specifically, referring to FIG. 4, after the idling stop discharge processing starts, the capacity management implementation unit 23 causes the sub-battery 8 to discharge in Step S16. As shown in FIG. 9, the capacity management implementation unit 23 causes the sub-battery 8 to discharge by opening the first switch 9 and closing the second switch 10. As a result of this discharge, the electric component load 6 is operated during the idling stop.

Next, in Step S17, the discharge amount limitation unit 24 determines whether or not the current estimated residual capacity value $C_{sub}$ of the sub-battery 8 stored in the memory 25 is equal to or smaller than the discharge limit capacity value $C_{lim}$.

When the discharge amount limitation unit 24 determines in Step S17 that the current estimated residual capacity value $C_{sub}$ of the sub-battery 8 stored in the memory 25 is equal to or smaller than the discharge limit capacity value $C_{lim}$, the discharge amount limitation unit 24 halts discharging of the sub-battery 8 in Step S19. Thereafter, the processing flow is returned. The discharge amount limitation unit 24 halts discharging of the sub-battery 8 by opening the second switch 10 while keeping the first switch 9 open. When, on the other hand, the discharge amount limitation unit 24 determines in Step S17 that the current estimated residual capacity value $C_{sub}$ of the sub-battery 8 stored in the memory 25 is not equal to or smaller than the discharge limit capacity value $C_{lim}$, the battery charging/discharging control unit 12 determines in Step S18 whether or not an idling stop interruption operation has been performed on the basis of a signal from the engine control unit 2. When the battery charging/discharging control unit 12 determines that an idling stop interruption operation has been performed, the processing of Step S19 is performed by the discharge amount limitation unit 24. When, on the other hand, the battery charging/discharging control unit 12 determines that an idling stop interruption operation has not been performed, the residual capacity estimation unit 21 calculates a discharge amount of the sub-battery 8 during discharging by calculating a product of a control cycle time (dt) and an estimated consumed current accompanying load-driving of the sub-battery 8, calculates a new estimated residual capacity value $C_{sub}$ of the sub-battery 8 by subtracting the calculated discharge amount from the current estimated residual capacity value $C_{sub}$ of the sub-battery 8 stored in the memory 25, and updates the current estimated residual capacity value $C_{sub}$ of the sub-battery 8 stored in the memory 25 to the calculated new estimated residual capacity value $C_{sub}$, in Step S20. Thereafter, the processing of Step S16 onward is performed.

Figure 5:
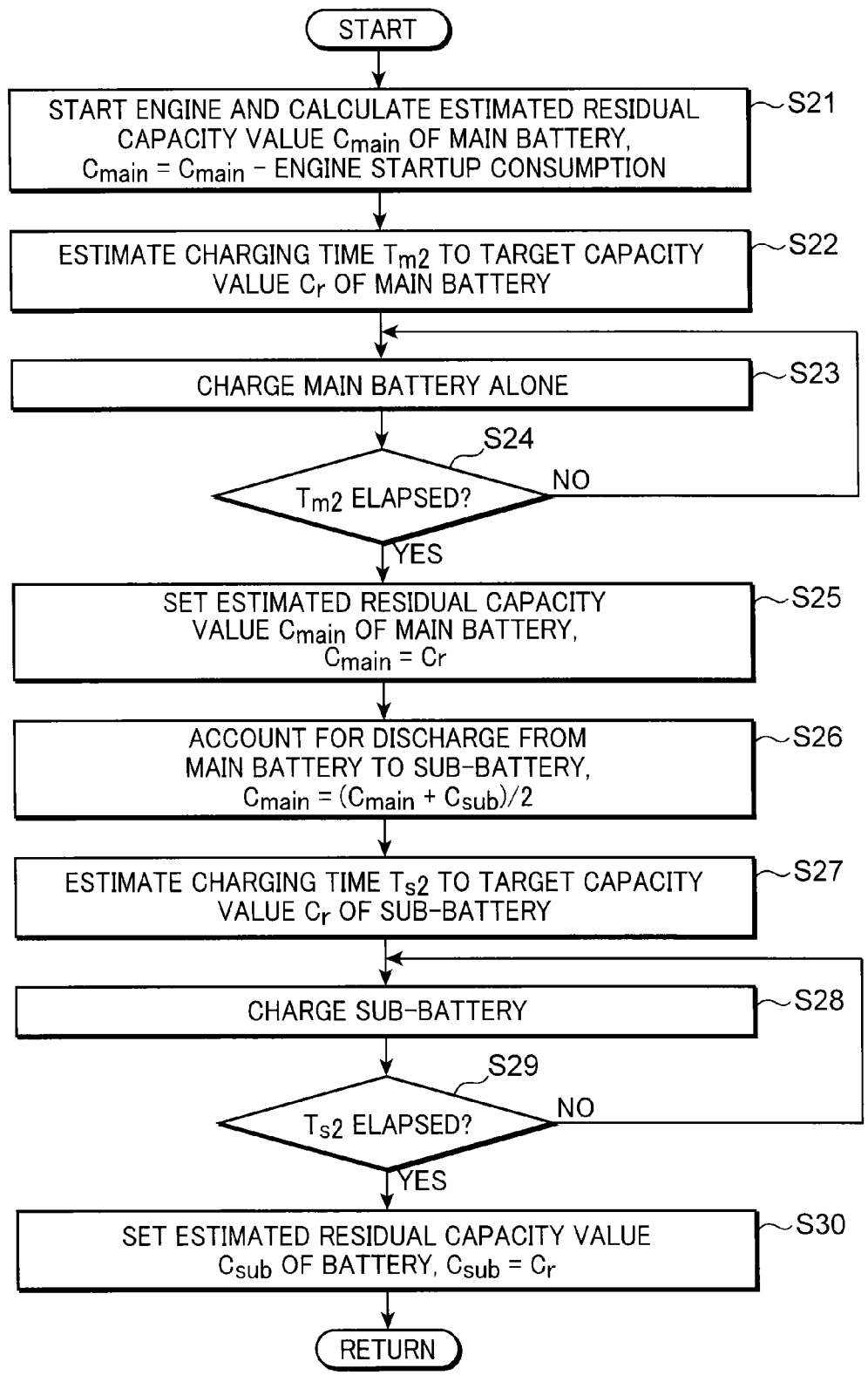
FIG. 5 is a flowchart showing a sub-routine of engine restarting and battery charging.

Further, in Step S14 of FIG. 3, the engine 1 is restarted and the main battery 7 and sub-battery 8 are charged in accordance with a flowchart of a sub-routine shown in FIG. 5.

More specifically, after starting the processing relating to restarting of the engine 1 and charging of the batteries 7, 8, in Step S21, power is supplied, similarly to the engine startup operation of Step S1, to the engine starting starter of the electric component loads 6 from the main battery 7 in order to restart the engine 1 by closing the first switch 9 and opening the second switch 10, as shown in FIG. 6. Next, the estimated residual capacity value $C_{main}$ of the main battery 7 following restarting of the engine 1 is calculated by subtracting a capacity of the main battery 7 consumed during restarting of the engine 1 from the current estimated residual capacity value $C_{main}$ of the main battery 7 stored in the memory 25, whereupon the estimated residual capacity value $C_{main}$ of the main battery 7 stored in the memory 25 is updated to the calculated estimated residual capacity value $C_{main}$. Note that the capacity of the main battery 7 consumed during restarting of the engine 1 is an experiential value or an actually measured value that is set in advance for use.

Next, in Step S22, the charging time estimation unit 22 estimates a charging time $T_{m2}$ required to charge the main battery 7 from the current estimated residual capacity value $C_{main}$ stored in the memory 25 to the charging target capacity value $C_r$ of the main battery 7. Next, in Step S23, charging is performed on the main battery 7 alone. As shown in FIG. 7, the capacity management implementation unit 23 performs charging on the main battery 7 alone by keeping the first switch 9 closed and the second switch 10 open, similarly to the engine restarting operation. In Step S24, the capacity management implementation unit 23 determines whether or not the charging time $T_{m2}$ has elapsed, and when the charging time $T_{m2}$ is determined to have elapsed, the residual capacity estimation unit 21 sets the estimated residual capacity value $C_{main}$ of the main battery 7 in Step S25 by replacing the current estimated residual capacity value $C_{main}$ of the main battery 7 stored in the memory 25 with the charging target capacity value $C_r$ of the main battery 7. Note that when the capacity management implementation unit 23 determines that the charging time $T_{m2}$ has not yet elapsed in Step S24, the processing of Step S23 onward is repeated.

Next, in Step S26, the residual capacity estimation unit 21 accounts for discharge from the main battery 7 to the sub-battery 8. More specifically, similarly to Step S7 in FIG. 2, the residual capacity estimation unit 21 calculates the estimated residual capacity value $C_{main}$ of the main battery 7 using the following Equation (1), and replaces the estimated residual capacity value $C_{main}$ of the main battery 7 stored in the memory 25 with the calculated estimated residual capacity value $C_{main}$.

$$C_{main}=(C_{main}+C_{sub})/2 \qquad (1)$$

Next, in Step S27, the charging time estimation unit 22 estimates a charging time $T_{s2}$ required to charge the sub-battery 8 from the estimated residual capacity value $C_{sub}$ of the sub-battery 8 stored in the memory 25 to the charging target capacity value $C_r$ of the sub-battery 8. Next, in Step S28, the sub-battery 8 is charged together with the main battery 7. As shown in FIG. 8, the capacity management implementation unit 23 charges the sub-battery 8 by closing both the first switch 9 and the second switch 10. In Step S29, the capacity management implementation unit 23 determines whether or not the charging time $T_{s2}$ has elapsed, and when the charging time $T_{s2}$ is determined to have elapsed, the residual capacity estimation unit 21 sets the estimated residual capacity value $C_{sub}$ of the sub-battery 8 in Step S30 by replacing the estimated residual capacity value $C_{sub}$ of the sub-battery 8 stored in the memory 25 with the charging target capacity value $C_r$ of the sub-battery 8. The processing flow is then returned. Note that when the capacity management implementation unit 23 determines that the charging time $T_{s2}$ has not yet elapsed in Step S29, the processing of Step S28 onward is repeated.

In the processing of the flowcharts shown in FIGS. 2 to 5, described above, the processing of Steps S1, S5 to S7, S11, S20, S21, S25, S26, and S30 in particular is implemented by the residual capacity estimation unit 21. Further, the processing of Steps S2, S8, S22, and S27 is implemented by the charging time estimation unit 22. Furthermore, the processing of Steps S3, S4, S9, S10, S23, S24, S28, and S29 is implemented by the capacity management implementation unit 23. Moreover, the processing of Steps S17 and S19 in FIG. 4 is implemented by the discharge amount limitation unit 24.

Note that an estimated residual capacity value calculated during an operation of the operating machine prior to the previous operation is used as the estimated residual capacity value $C_{main}$ of the main battery 7 in Step S1 of FIG. 2. However, when the implemented operation is the first operation of the operating machine, an appropriate value must be set as the estimated residual capacity value $C_{main}$. In this case, when the main battery 7 is a new battery, for example, 100% of a nominal capacity of the battery may be set as the estimated residual capacity value $C_{main}$. Further, when it is possible to start the engine 1 in Step S1, it may be considered that at least the capacity required to start the engine 1 remained in the main battery 7 before starting the engine 1, and therefore, in Step S1, the estimated residual capacity value $C_{main}$ of the main battery 7 may be set at a capacity calculated by subtracting the capacity consumed to start the engine 1 from the capacity required to start the engine 1.

Next, a method employed by the charging time estimation unit 22 to estimate the charging times $T_{m1}, T_{s1}, T_{m2}, T_{s2}$ will be described.

Figure 10:
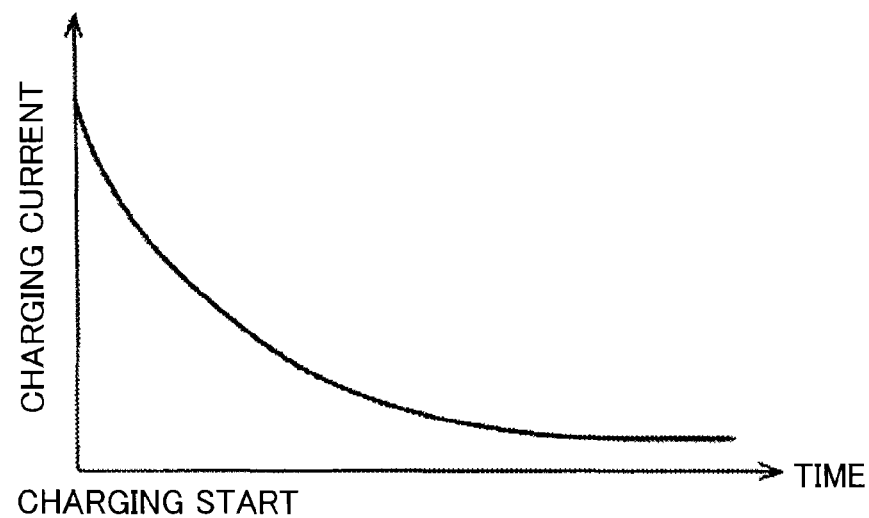
FIG. 10 is a view showing a correlation between a battery charging current and an elapsed time.

As shown in FIG. 10, a battery typically has a characteristic whereby, when charging is implemented at a certain fixed voltage, a charging current increases immediately after charging begins and then decreases as the capacity is restored. To calculate the charging time in consideration of this characteristic, a battery characteristic expressed by a correlation between the battery capacity and a battery receivable current, as shown in FIG. 11, and a battery characteristic expressed by a correlation between the current battery capacity and the charging time required to charge the battery to the target capacity value, as shown in FIG. 12, are stored in the memory 25 in advance, whereupon the charging time estimation unit 22 estimates the charging time of the battery on the basis of these two characteristics by implementing following procedures (1) to (6).

(1) A charging current $I_b$ is calculated by subtracting the current consumed by the load from the current generated by the alternator 5. It is necessary here to consider the current generated by the alternator 5 and the current consumed by the load to be constant. In this case, a value of the current generated by the alternator 5 when the engine 1 rotates at a low speed is preferably employed as the current generated by the alternator 5, while a maximum possible value of the current consumed by the load is preferably employed as the current consumed by the load.

Figure 11:
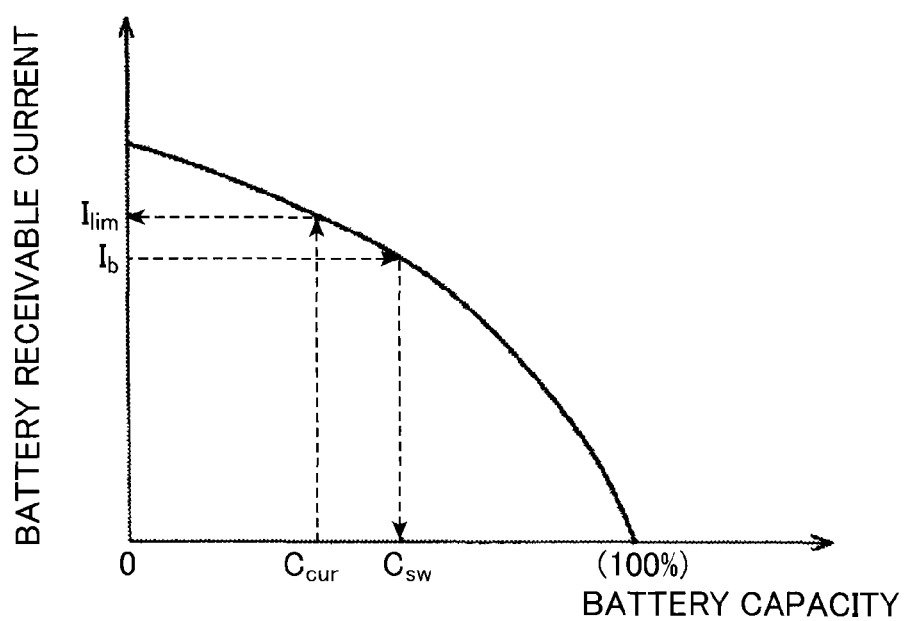
FIG. 11 is a view showing a correlation between a battery capacity and a battery receivable current.
Figure 12:
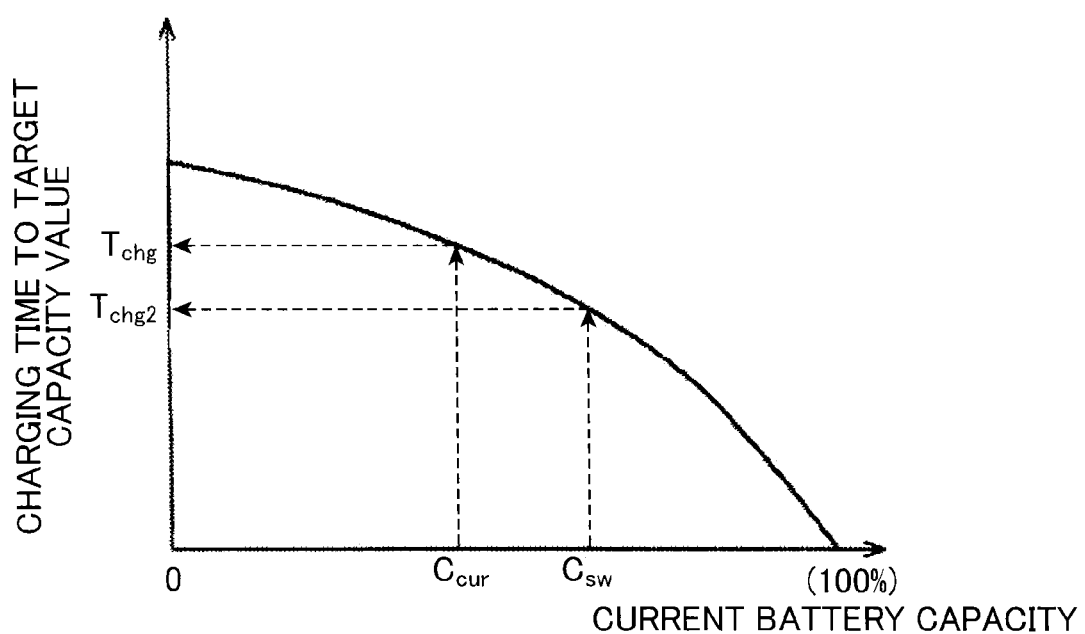
FIG. 12 is a view showing a correlation between a current battery capacity and a charging time required to charge a corresponding battery to a target capacity value.

(2) A battery receivable current $I_{lim}$ corresponding to a current estimated residual capacity value $C_{cur}$ (specifically, $C_{main}$, $C_{sub}$) of a charging subject battery is determined from the current estimated residual capacity value $C_{cur}$ and a battery characteristic constituted by a correlation curve between the battery capacity and the battery receivable current, as shown in FIG. 11.

(3) A magnitude comparison is made between the charging current $I_b$ and the battery receivable current $I_{lim}$. When the charging current $I_b$ is larger than the battery receivable current $I_{lim}$, or in other words when $I_b > I_{lim}$, the charging time is determined as illustrated below in (4). When the charging current $I_b$ is equal to or smaller than the battery receivable current $I_{lim}$, or in other words when $I_b \leq I_{lim}$, on the other hand, the charging time is determined as illustrated below in (5) and (6).

(4) A charging time $T_{chg}$ corresponding to the current estimated residual capacity value $C_{cur}$ of the charging subject battery is determined from the current estimated residual capacity value $C_{cur}$ and a battery characteristic constituted by a correlation curve between the current battery capacity and the charging time required to charge the battery to the target capacity value, as shown in FIG. 12. The determined charging time $T_{chg}$ is then set as the charging time $T_{m1}, T_{s1}, T_{m2}, T_{s2}$ of the charging subject battery.

(5) A battery capacity $C_{sw}$ when the battery receivable current corresponds to $I_b$ is determined from the battery characteristic constituted by the correlation curve between the battery capacity and the battery receivable current, as shown in FIG. 11, whereupon a charging time $T_{chg1}$ required to charge the battery to $C_{sw}$ from the current estimated residual capacity value $C_{cur}$ is calculated using a following Equation (2).

$$T_{chg1} = (C_{sw} - C_{cur})/I_b \qquad (2)$$

(6) A charging time $T_{chg2}$ corresponding to the current battery capacity $C_{sw}$ is determined from the battery characteristic constituted by the correlation curve between the current battery capacity and the charging time, as shown in FIG. 12, whereupon the determined charging time $T_{chg2}$ is set as a charging time $T_{chg2}$ required to charge the battery from the battery capacity $C_{sw}$ to the target capacity value $C_r$. A total time $(T_{chg1} + T_{chg2})$ of the charging time $T_{chg2}$ and the previously calculated charging time $T_{chg1}$ is then set as the charging time $T_{m1}, T_{s1}, T_{m2}, T_{s2}$ of the charging subject battery.

As described above, according to the control performed by the battery charging/discharging control unit 12, the estimated residual capacity value $C_{main}$ of the main battery 7 and the estimated residual capacity value $C_{sub}$ of the sub-battery 8 are determined, the charging times $T_{m1}, T_{s1}, T_{m2}, T_{s2}$ required to charge the respective batteries 7, 8 from the determined estimated residual capacity values $C_{main}, C_{sub}$ to the charging target capacity values $C_r$ of the respective batteries 7, 8 are estimated, and opening/closing of the first switch 9 and the second switch 10 is controlled such that the respective batteries 7, 8 are charged during the estimated charging times $T_{m1}, T_{s1}, T_{m2}, T_{s2}$. As a result, capacity management can be implemented on the main battery 7 and the sub-battery 8.

In particular, under this capacity management, the residual capacity of the sub-battery 8 during the idling stop is maintained at or above the set value (the discharge limit capacity value $C_{lim}$), and therefore the amount of discharge from the main battery 7 to the sub-battery 8 corresponding to the capacity difference between the main battery 7 and the sub-battery 8 during subsequent charging can be limited. Hence, sufficient capacity for starting the engine 1 can be secured in the main battery 7 at all times, even when a sufficient charging time cannot be secured due to interruption of the operation performed by the operating machine or the like. As a result, a startup fault in the engine 1 due to a capacity deficit in the main battery 7 can be avoided reliably.

Further, in the capacity management described above, sensors for detecting the capacities and currents of the batteries 7, 8 and so on are not required, and therefore implementation of the capacity management can be facilitated in terms of cost and so on.

Second Embodiment

Figure 13:
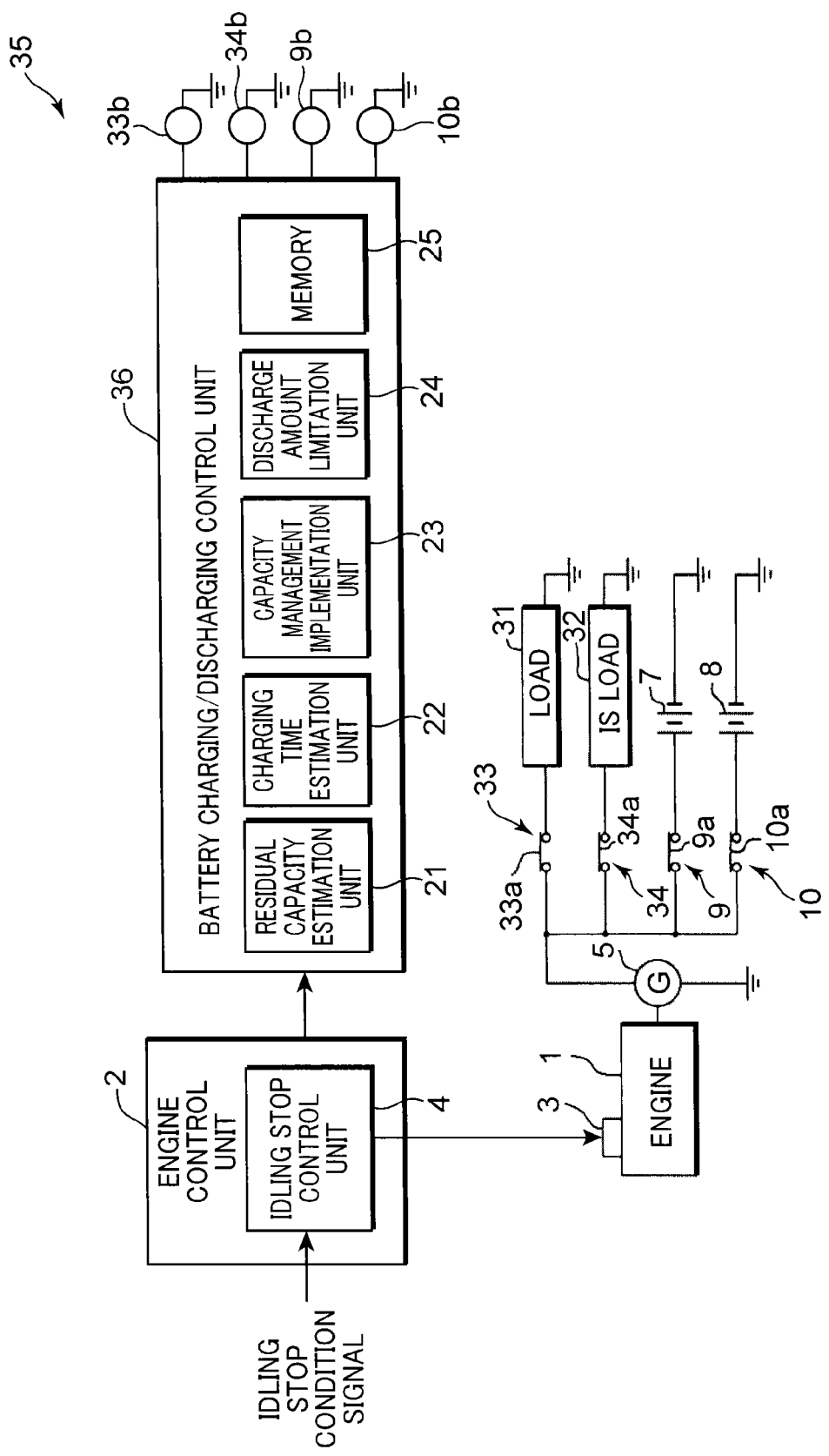
FIG. 13 is a view corresponding to FIG. 1, showing an operating machine according to a second embodiment of the present invention.

FIG. 13 is a block diagram showing an operating machine equipped with a battery charging/discharging control device according to a second embodiment of the present invention. In the second embodiment, the loads of the various electric components serving as the electric loads of the operating machine are divided into a normal load 31 and an idling stop exclusive load (to be referred to hereafter as an IS load) 32 that is lighter than the normal load 31. The normal load 31 and the IS load 32 are connected in parallel to the alternator 5 serving as a power generation device, the normal load 31 being connected to the alternator 5 via a third switch 33 and the IS load 32 being connected to the alternator 5 via a fourth switch 34. With this configuration, one of the normal load 31 and the IS load 32 is capable of receiving a power supply selectively from the alternator 5.

The third switch 33 and the fourth switch 34 are constituted by identical relay switches to the first switch 9 and the second switch 10. A relay contact 33a of the third switch 33 is connected in series to the normal load 31, and a relay contact 34a of the fourth switch 34 is connected in series to the IS load 32. Opening and closing of the relay contacts 33a, 34a of the two switches 33, 34 are controlled together with opening and closing of the relay contacts 9a, 10a of the first switch 9 and the second switch 10 by a battery charging/discharging control device 35. The battery charging/discharging control device 35 includes the relay coil 9b of the first switch 9, the relay coil 10b of the second switch 10, a relay coil 33b of the third switch 33, a relay coil 34b of the fourth switch 34, and a battery charging/discharging control unit 36 that controls energization of the four relay coils 9b, 10b, 33b, 34b. Similarly to the battery charging/discharging control unit 12 of the first embodiment, information indicating the operating condition of the engine 1 and so on is input into the battery charging/discharging control unit 36 from the engine control unit 2 in the form of signals. Note that the engine 1, engine control unit 2, alternator 5, main battery 7, sub-battery 8, and so on provided in the operating machine are configured identically to the first embodiment. Further, identical members have been allocated identical reference symbols and description thereof has been omitted.

The content of control executed by the battery charging/discharging control unit 36 is basically identical to the content of the control executed by the battery charging/discharging control unit 12, described in the first embodiment using the flowcharts shown in FIGS. 2 to 5. In the content of the control executed by the battery charging/discharging control unit 36 according to the second embodiment, however, control for opening and closing the third switch 33 and the fourth switch 34 as well as opening and closing the first switch 9 and the second switch 10 has been added to the processes for implementing capacity management on the main battery 7 and the sub-battery 8.

Figure 14:
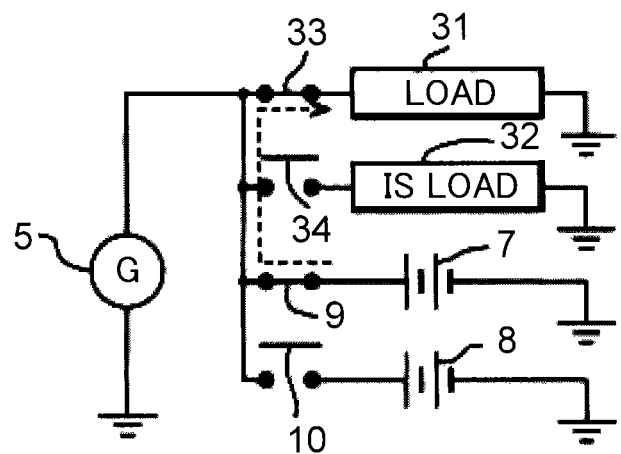
FIGS. 14 to 17 are views corresponding to FIGS. 6 to 9, illustrating the content of control executed by a battery charging/discharging control unit according to the second embodiment.

More specifically, as shown in FIG. 14, during startup of the engine 1 (Step S1 in FIG. 2) or restarting of the engine 1 following an idling stop (Step S21 in FIG. 5), the battery charging/discharging control unit 36 closes the first switch 9, opens the second switch 10, closes the third switch 33, and opens the fourth switch 34, whereby power is supplied, or in other words charging is performed, from the main battery 7 to the normal load 31, in particular the engine starting starter. As a result, the engine 1 is started.

Figure 15:
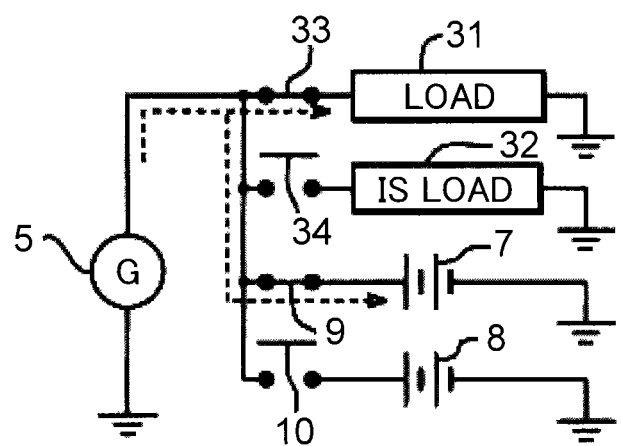

As shown in FIG. 15, during charging of the main battery 7 alone (Step S3 in FIG. 2, Step S23 in FIG. 5), the capacity management implementation unit 23 of the battery charging/discharging control unit 36 keeps the first switch 9 closed, keeps the second switch 10 open, keeps the third switch 33 closed, and keeps the fourth switch 34 open, as in the engine starting operation, whereby generated power is supplied from the alternator 5 to the normal load 31 and the main battery 7. As a result, charging is performed on the main battery 7 alone.

Figure 16:
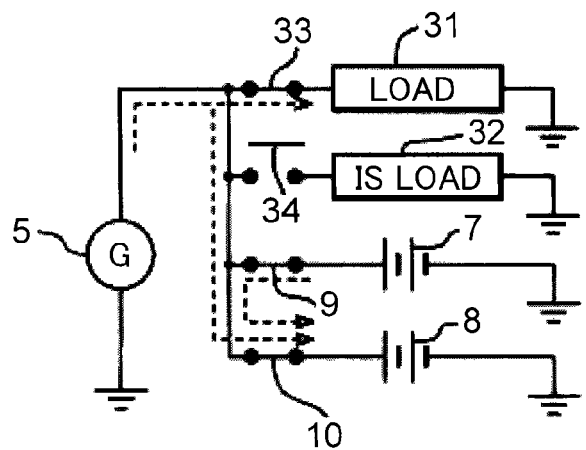

As shown in FIG. 16, during charging of the sub-battery 8 (Step S9 in FIG. 2, Step S28 in FIG. 5), the capacity management implementation unit 23 of the battery charging/discharging control unit 36 closes both the first switch 9 and the second switch 10, closes the third switch 33, and opens the fourth switch 34, whereby generated power is supplied from the alternator 5 to the normal load 31, the main battery 7, and the sub-battery 8. As a result, charging is performed on the sub-battery 8.

Figure 17:
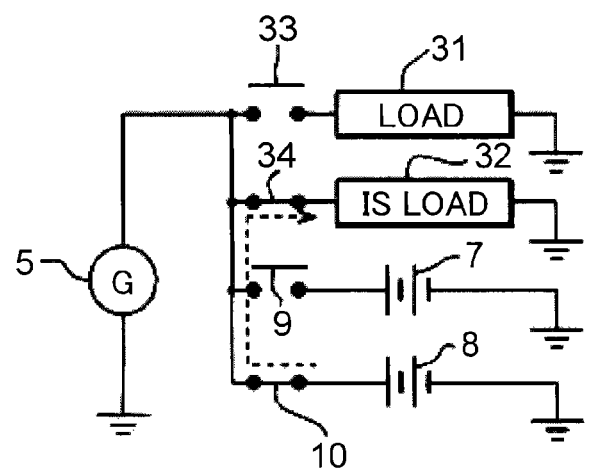
Figure 18:
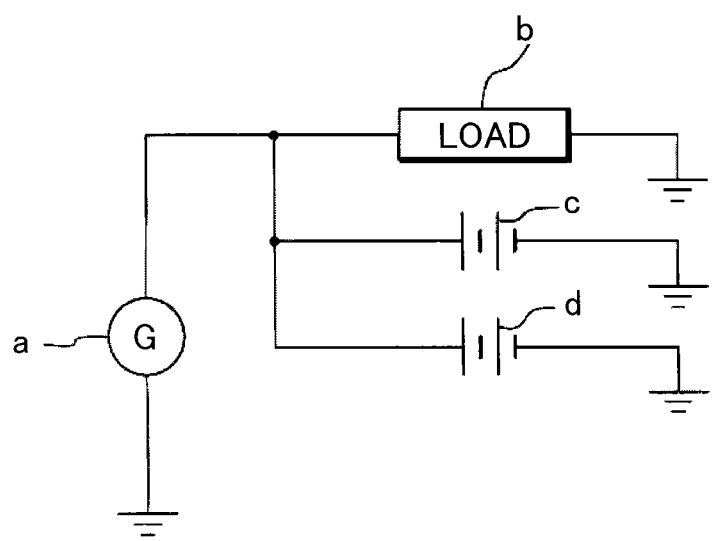
FIG. 18 is a view showing a circuit configuration of an operating machine equipped with two batteries.

As shown in FIG. 17, during an idling stop, the capacity management implementation unit 23 of the battery charging/discharging control unit 36 opens the first switch 9, closes the second switch 10, opens the third switch 33, and closes the fourth switch 34, whereby discharge is performed from the sub-battery 8 to the IS load 32. As a result, the IS load 32 is operated.

With the control performed by the battery charging/discharging control unit 36 according to the second embodiment, similar actions and effects to those obtained with the control performed by the battery charging/discharging control unit 12 according to the first embodiment can be obtained. In addition, by controlling opening and closing of the third switch 33 and the fourth switch 34 such that the IS load 32 is operated during an idling stop and the normal load 31 is operated during engine startup and battery charging, the consumed current value of the sub-battery 8 during an idling stop can be reduced, enabling a corresponding increase in a period during which an idling stop can be maintained the engine 1.

Note that the present invention is not limited to the first and second embodiments described above, and includes various other embodiments. For example, in the above embodiments, the first switch 9 and the second switch 10 constituted by relay switches are used to connect main battery 7 and the sub-battery 8 in parallel to the alternator 5 serving as a power generation device and switch the respective batteries 7, 8 between a chargeable condition and a non-chargeable condition, the relay contact 9a of the first switch 9 being connected in series to the main battery 7 and the relay contact 10a of the second switch 10 being connected in series to the sub-battery 8. However, the main battery 7 and the sub-battery 8 may be switched between the chargeable condition and the non-chargeable condition using a single switch including a first switch and a second switch, and a switch other than a relay switch may be used.

Further, in both of the above embodiments, the battery charging/discharging control unit 12, 36 of the battery charging/discharging control device 11, 35 is provided separately to the engine control unit 2, and the battery charging/discharging control unit 12, 36 receives signals from the engine control unit 2. If necessary, however, the engine control unit 2 and the battery charging/discharging control unit 12, 36 may be constituted by a single control unit.

Furthermore, in the first embodiment, due to the need to calculate the charging times of the respective batteries 7, 8 in advance, the charging time is calculated using a value of the current generated by the alternator 5 when the engine 1 rotates at a low speed as the current generated by the alternator 5 and the maximum possible value of the current consumed by the load as the current consumed by the load, whereupon the respective batteries 7, 8 are charged for the resulting charging times. In certain cases, however, the capacity values of the respective batteries 7, 8 may be determined by integrating the current values charged to the respective batteries 7, 8 in accordance with the rotation speed of the engine 1 and the operating condition of the load, and a determination as to whether or not charging of the respective batteries 7, 8 is complete may be made on the basis of the determined capacity values. With this method, the charging times of the batteries 7, 8 secured when the rotation speed of the engine 1 is high and the current consumed by the load is small can be shortened, and as a result, the charging operation can be implemented efficiently, taking into account the operating condition of the operating machine.

Moreover, the battery charging/discharging control unit may modify the set value (the discharge limit capacity value) serving as a reference for limiting the discharge amount of the sub-battery 8 in accordance with a stoppage period of the engine 1 extending from stoppage of the engine 1 during the previous operation of the operating machine to starting of the engine 1 during the current operation. More specifically, when the stoppage period of the engine 1 is smaller than a preset specific period (24 hours, for example), the battery charging/discharging control unit may set the capacity of the sub-battery 8 at a previous stoppage point of the engine 1 as the discharge limit capacity value of the sub-battery 8 during the current operation, and when the stoppage period of the engine 1 is equal to or greater than the specific period, the battery charging/discharging control unit may set a value corresponding to a preset specific ratio (75%, for example) of a rated capacity of the sub-battery 8 as the discharge limit capacity value of the sub-battery 8 during the current operation.

[Summary of the Embodiments]

The above and other embodiments are summarized as follows.

An operating machine according to the above and other embodiments includes: an engine serving as a power source; an engine control unit that performs idling stop control, in which the engine is stopped automatically during an idling operation, when a predetermined condition is established; an electric component; a power generation device that is driven by the engine to supply electricity; a first battery that is connected to the power generation device via a first switch, switched by the first switch between a condition of being charged by the power generation device and a condition of not being charged, and used to start the engine; a second battery that is connected to the power generation device in parallel with the first battery via a second switch, switched by the second switch between a condition of being charged by the power generation device and a condition of not being charged, and used to operate the electric component during an idling stop in the engine; a residual capacity estimation unit that estimates a first estimated residual capacity which is a residual capacity of the first battery and a second estimated residual capacity which is a residual capacity of the second battery; a charging time estimation unit that estimates a first estimated charging time which is a charging time required to restore a capacity of the first battery from the first estimated residual capacity to a target capacity value of the first battery and a second estimated charging time which is a charging time required to restore a capacity of the second battery from the second estimated residual capacity to a target capacity value of the second battery; a capacity management implementation unit that implements capacity management on the first battery by controlling the first switch such that the first battery is charged for the first estimated charging time and implements capacity management on the second battery by controlling the second switch such that the second battery is charged for the second estimated charging time; and a discharge amount limitation unit for limiting a discharge amount of the second battery during the idling stop in the engine so that a residual capacity of the second battery after discharge is maintained at or above a set value.

With this configuration, the charging time estimation unit estimates the charging times of the respective batteries required to restore the capacities of the respective batteries from the estimated residual capacities of the respective batteries to the target capacity values of the respective batteries, and the capacity management implementation unit implements capacity management on the respective batteries by controlling the respective switches such that the batteries are charged for the respective estimated charging times. Under this capacity management, the discharge amount of the second battery is limited by the discharge amount limitation unit during the idling stop in the engine so that the residual capacity of the second battery after discharge is maintained at or above the set value, and therefore the amount of discharge from the first battery to the second battery corresponding to the capacity difference between the first battery and the second battery during subsequent charging is limited. Hence, sufficient capacity for starting the engine can be secured in the first battery at all times, even when a sufficient charging time cannot be secured due to interruption of the operation performed by the operating machine or the like. As a result, a startup fault in the engine due to a capacity deficit in the first battery can be avoided reliably. Further, in the capacity management described above, sensors for detecting the capacities and currents of the batteries and so on are not required, and therefore implementation of the capacity management can be facilitated in terms of cost, reliability, and so on.

In the operating machine described above, the set value is preferably set at a value that satisfies a condition whereby, when discharge from the first battery having a larger capacity than the set value to the second battery having a capacity equal to the set value is performed due to a capacity difference between the first battery and the second battery, the residual capacity of the first battery is maintained at or above a minimum capacity required to start the engine. As a specific configuration in this case, the set value may be set at a value that satisfies a condition whereby the minimum capacity required to start the engine is smaller than a value of half a sum of the set value and a capacity of the first battery before discharge is performed from the first battery to the second battery following the idling stop.

According to this configuration, the set value that serves as a reference for limiting the discharge amount of the second battery during the idling stop in the engine can be set specifically.

In the operating machine described above, the operating machine preferably further includes a memory which stores the first estimated residual capacity and the second estimated residual capacity, the residual capacity estimation unit preferably estimates a new first estimated residual capacity by determining a discharge amount during every discharge operation of the first battery and subtracting the determined discharge amount of the first battery from the first estimated residual capacity stored in the memory at that time, and preferably updates the first estimated residual capacity stored in the memory to the new first estimated residual capacity, the residual capacity estimation unit preferably estimates a new second estimated residual capacity by determining a discharge amount during every discharge operation of the second battery and subtracting the determined discharge amount of the second battery from the second estimated residual capacity stored in the memory at that time, and preferably updates the second estimated residual capacity stored in the memory to the new second estimated residual capacity. Further, when the charging time estimation unit estimates the first estimated charging time, the charging time estimation unit preferably uses the first estimated residual capacity stored in the memory at that time, and when the charging time estimation unit estimates the second estimated charging time, the charging time estimation unit preferably uses the second estimated residual capacity stored in the memory at that time.

According to this configuration, a specific method enabling the residual capacity estimation unit to estimate the residual capacities of the respective batteries can be provided in the operating machine.

In the operating machine described above, the charging time estimation unit preferably estimates the first estimated charging time and the second estimated charging time on the basis of a correlation between a predetermined battery capacity and a battery receivable current and a correlation between a current battery capacity and a charging time required to charge a corresponding battery to the target capacity value.

According to this configuration, a specific method enabling the charging time estimation unit to estimate the charging times of the respective batteries can be provided in the operating machine.

Hence, in the above and other embodiments, when implementing capacity management on the first battery for starting the engine and the second battery for operating the electric component during an idling stop, the residual capacity of the second battery after discharge is maintained at or above the set value during the idling stop, and therefore the amount of discharge from the first battery to the second battery during charging is limited. Accordingly, sufficient capacity for starting the engine can be secured in the first battery at all times, even when a sufficient charging time cannot be secured due to interruption of the operation performed by the operating machine or the like. As a result, a startup fault in the engine due to a capacity deficit in the first battery can be avoided reliably. Further, in the capacity management implemented on the two batteries, sensors for detecting the capacities and currents of the batteries and so on are not required, and therefore implementation of the capacity management can be facilitated in terms of cost and so on.

This application is based on Japanese Patent application No. 2011-213917 filed in Japan Patent Office on Sep. 29, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operating machine comprising:
   an engine serving as a power source;
   an engine control unit that performs idling stop control, in which said engine is stopped automatically during an idling operation, when a predetermined condition is established;
   an electric component;
   a power generation device that is driven by said engine to supply electricity;

a first battery that is connected to said power generation device via a first switch, switched by said first switch between a condition of being charged by said power generation device and a condition of not being charged, and used to start said engine;

a second battery that is connected to said power generation device in parallel with said first battery via a second switch, switched by said second switch between a condition of being charged by said power generation device and a condition of not being charged, and used to operate said electric component during an idling stop in said engine;

a residual capacity estimation unit that estimates a first estimated residual capacity which is a residual capacity of said first battery and a second estimated residual capacity which is a residual capacity of said second battery;

a charging time estimation unit that estimates a first estimated charging time which is a charging time required to restore a capacity of said first battery from said first estimated residual capacity to a target capacity value of said first battery and a second estimated charging time which is a charging time required to restore a capacity of said second battery from said second estimated residual capacity to a target capacity value of said second battery;

a capacity management implementation unit that implements capacity management on said first battery by controlling said first switch such that said first battery is charged for said first estimated charging time and implements capacity management on said second battery by controlling said second switch such that said second battery is charged for said second estimated charging time; and a discharge amount limitation unit for limiting a discharge amount of said second battery during said idling stop in said engine so that a residual capacity of said second battery after discharge is maintained at or above a set value.

2. The operating machine according to claim 1, wherein said set value is set at a value that satisfies a condition whereby, when discharge from said first battery having a larger capacity than said set value to said second battery having a capacity equal to said set value is performed due to a capacity difference between said first battery and said second battery, said residual capacity of said first battery is maintained at or above a minimum capacity required to start said engine.

3. The operating machine according to claim 2, wherein said set value is set at a value that satisfies a condition whereby said minimum capacity required to start said engine is smaller than a value of half a sum of said set value and a capacity of said first battery before discharge is performed from said first battery to said second battery following said idling stop.

4. The operating machine according to claim 1, further comprising a memory which stores said first estimated residual capacity and said second estimated residual capacity, wherein said residual capacity estimation unit estimates a new first estimated residual capacity by determining a discharge amount during every discharge operation of said first battery and subtracting said determined discharge amount of said first battery from said first estimated residual capacity stored in said memory at that time, and updates said first estimated residual capacity stored in said memory to said new first estimated residual capacity, said residual capacity estimation unit estimates a new second estimated residual capacity by determining a discharge amount during every discharge operation of said second battery and subtracting said determined discharge amount of said second battery from said second estimated residual capacity stored in said memory at that time, and updates said second estimated residual capacity stored in said memory to said new second estimated residual capacity, when said charging time estimation unit estimates said first estimated charging time, said charging time estimation unit uses said first estimated residual capacity stored in said memory at that time, and when said charging time estimation unit estimates said second estimated charging time, said charging time estimation unit uses said second estimated residual capacity stored in said memory at that time.

5. The operating machine according to claim 1, wherein said charging time estimation unit estimates said first estimated charging time and said second estimated charging time on the basis of a correlation between a predetermined battery capacity and a battery receivable current and a correlation between a current battery capacity and a charging time required to charge a corresponding battery to said target capacity value.

* * * * *